United States Patent
Shiraki

(10) Patent No.: US 11,442,673 B2
(45) Date of Patent: Sep. 13, 2022

(54) IMAGE PROCESSING DEVICE CONFIGURED TO SEND SETTING DATA TO A TERMINAL DEVICE

(71) Applicant: BROTHER KOGYO KABUSHIKI KAISHA, Nagoya (JP)

(72) Inventor: Tomomi Shiraki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/215,664

(22) Filed: Mar. 29, 2021

(65) Prior Publication Data
US 2021/0303221 A1    Sep. 30, 2021

(30) Foreign Application Priority Data

Mar. 31, 2020 (JP) .............................. JP2020-063934
Jan. 19, 2021 (JP) .............................. JP2021-006266

(51) Int. Cl.
*G06F 3/12* (2006.01)
(52) U.S. Cl.
CPC ............ *G06F 3/122* (2013.01); *G06F 3/1257* (2013.01); *G06F 3/1286* (2013.01); *G06F 3/1287* (2013.01); *G06F 3/1293* (2013.01)
(58) Field of Classification Search
None
See application file for complete search history.

(56) References Cited

U.S. PATENT DOCUMENTS

| | | | |
|---|---|---|---|
| 7,733,507 B2 | 6/2010 | Toumanova et al. | |
| 2005/0162677 A1* | 7/2005 | Toumanova | G06F 3/1204 358/1.13 |
| 2011/0235089 A1 | 9/2011 | Xu et al. | |
| 2014/0139878 A1* | 5/2014 | Kadota | G06K 15/183 358/1.15 |
| 2020/0125301 A1 | 4/2020 | Kaneda | |
| 2020/0319830 A1 | 10/2020 | Kaneda et al. | |

FOREIGN PATENT DOCUMENTS

| | | |
|---|---|---|
| JP | 2019-006099 A | 1/2019 |
| JP | 2019-119089 A | 7/2019 |

OTHER PUBLICATIONS

Sweet et al., "Internet Printing Protocol/1.1: Model and Semantics", Standards Track, Apple Inc., Jan. 2017, pp. 1-221.
Extended European Search Report dated Aug. 9, 2021 from related EP21165468.6.

* cited by examiner

*Primary Examiner* — Lennin R Rodriguezgonzalez
(74) *Attorney, Agent, or Firm* — Scully, Scott, Murphy & Pressser, PC

(57) ABSTRACT

An image processing device may be configured to: in a case where an obtainment request is received from a first terminal device, send to the first terminal device at least one piece of setting data in a memory; in a case where specific setting data is selected from among the at least one piece of setting data in the first terminal device, receive from the first terminal device an execution request including related information related to the specific setting data; execute an image processing according to one or more setting values corresponding to the related information; determine whether target setting data exists in the memory, the target setting data being setting data of which non-use period exceeds a predetermined period; and in a case where the target setting data exists, delete the target setting data from the memory.

14 Claims, 8 Drawing Sheets

(Printing: Continuation of FIG. 2)

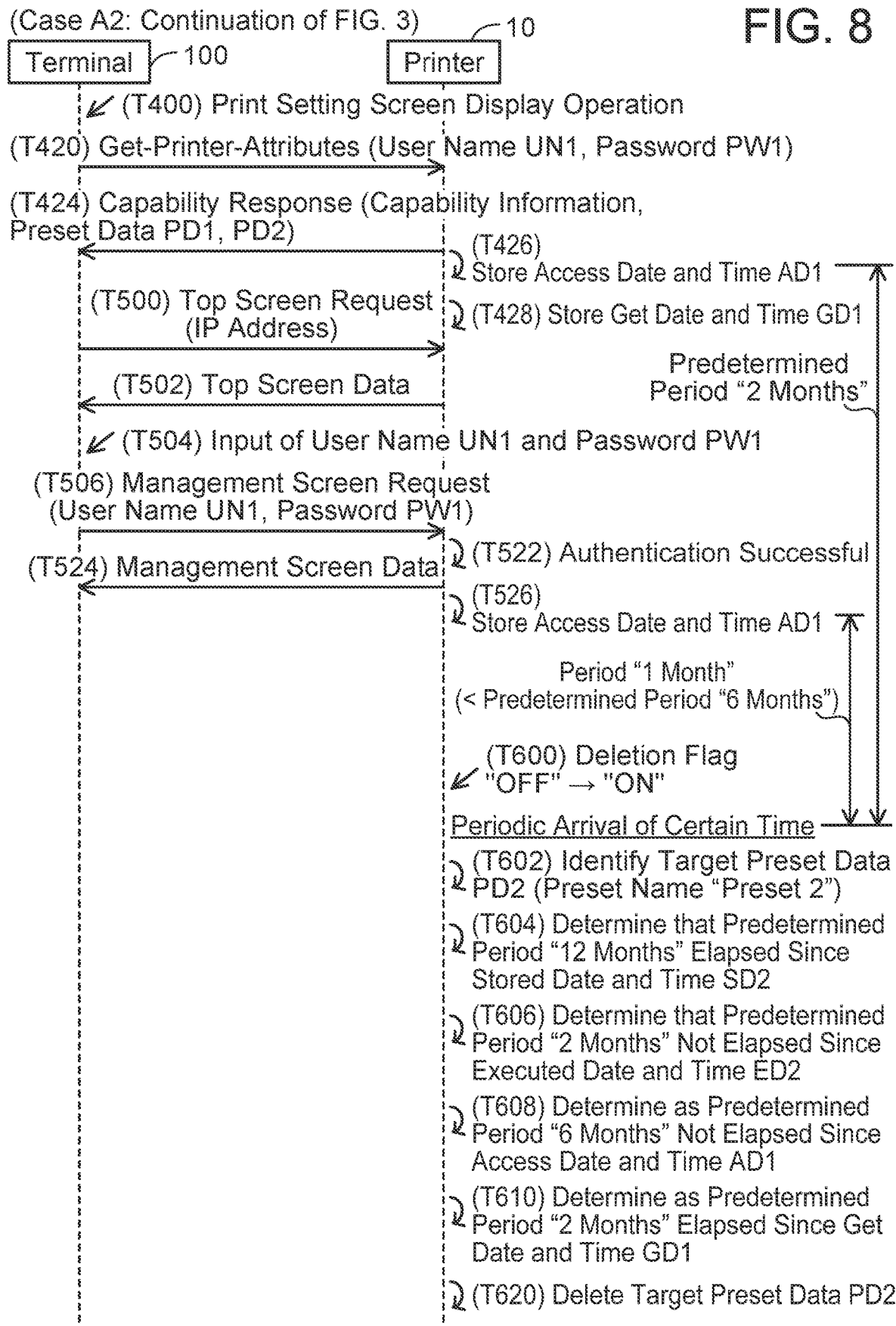

IMAGE PROCESSING DEVICE CONFIGURED TO SEND SETTING DATA TO A TERMINAL DEVICE

CROSS-REFERENCE TO RELATED APPLICATION

This application claims priority to Japanese Patent Application No. 2020-063934 filed on Mar. 31, 2020 and Japanese Patent Application No. 2021-006266 filed on Jan. 19, 2021, the contents of which are hereby incorporated by reference into the present application.

TECHNICAL FIELD

The disclosure herein discloses art for registering setting data to an image processing device.

DESCRIPTION OF RELATED ART

An image forming system provided with a host terminal and a printer is known. When a request for registering a print preset according to an Internet Printing Protocol (IPP) is received from the host terminal, the printer stores the print preset in a memory of the printer. Then, when an obtainment request is received from the host terminal, the printer sends the print preset to the host terminal. The host terminal reflects a print setting corresponding to the print preset on a print setting screen.

SUMMARY

A capacity of a memory of a printer is limited. The disclosure herein provides art for preventing an unnecessary increase in a data size of setting data in a memory of an image processing device that comprises the memory for storing setting data related to image processing.

An image processing device disclosed herein may comprise: an image processing execution unit configured to execute image processing; a memory configured to store a plurality of pieces of setting data related to the image processing; and a controller, wherein the controller is configured to: in a case where an obtainment request is received from a first terminal device, send to the first terminal device at least one piece of setting data among the plurality of pieces of setting data stored in the memory; in a case where specific setting data is selected from among the at least one piece of setting data in the first terminal device after the at least one piece of setting data has been sent to the first terminal device, receive from the first terminal device an execution request for the image processing, the execution request including related information related to the specific setting data; in a case where the execution request is received from the first terminal device, cause the image processing execution unit to execute the image processing according to one or more setting values corresponding to the related information included in the execution request; determine whether target setting data exists in the plurality of pieces of setting data stored in the memory, the target setting data being setting data of which non-use period exceeds a predetermined period; and in a case where it is determined that the target setting data exists, delete the target setting data from the memory.

A control method implemented by the image processing device, a computer program for the image processing device and a non-transitory computer-readable recording medium storing computer-readable instructions for the image processing device are also novel and useful.

BRIEF DESCRIPTION OF DRAWINGS

FIG. 8 shows specific Case A2.

EMBODIMENTS

Figure 1:
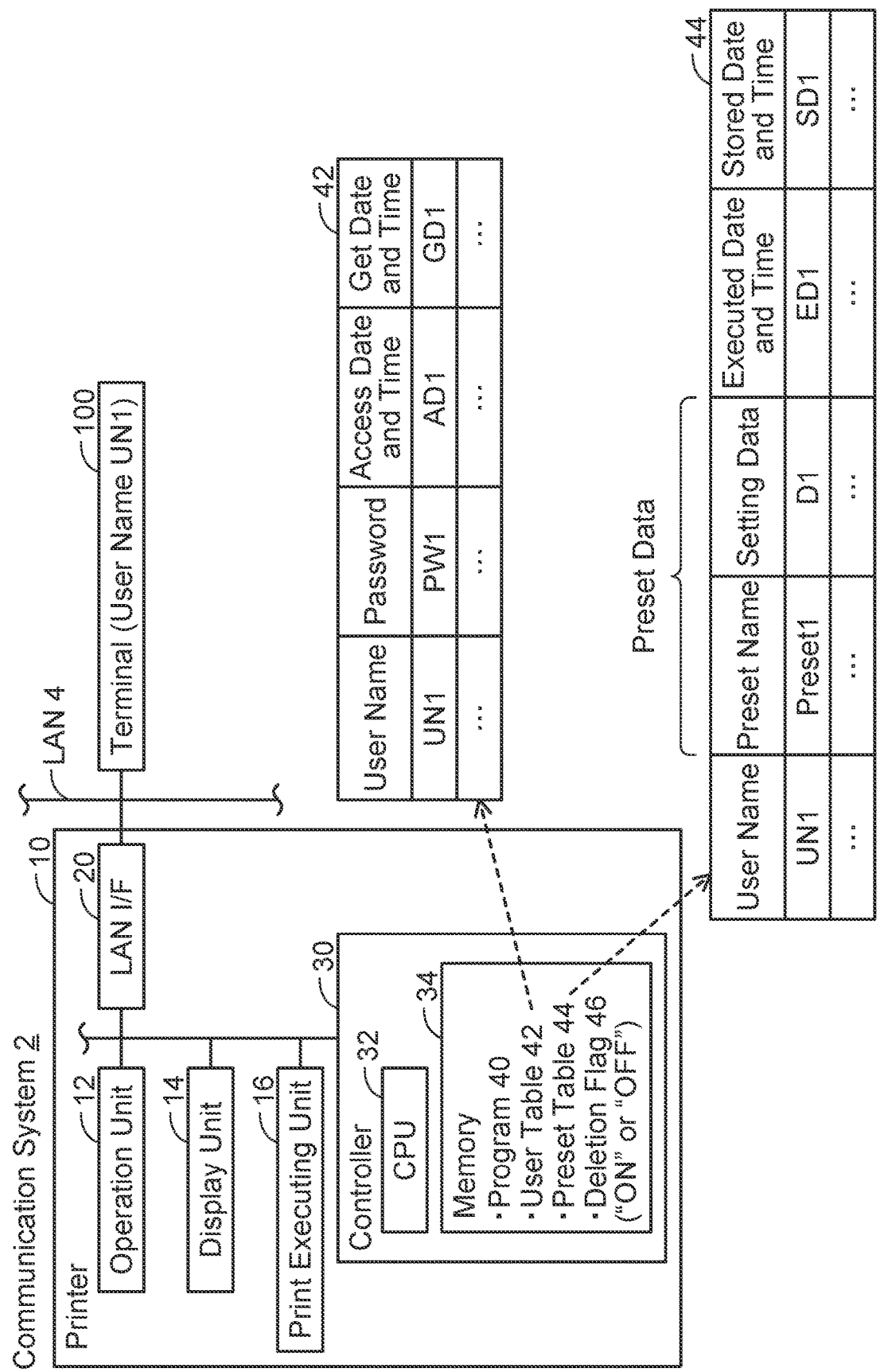
FIG. 1 shows a configuration of a communication system.

First Embodiment (Configuration of Communication System 2; FIG. 1)

As shown in FIG. 1, a communication system 2 is provided with a printer 10 and a terminal 100. The printer 10 and the terminal 100 belong to the same Local Area Network (LAN) 4 and are configured to communicate with each other through the LAN 4. The LAN 4 may be a wired LAN or a wireless LAN.

(Configuration of Terminal 100)

The terminal 100 is a stationary terminal device such as a PC. In a variant, the terminal 100 may be a portable terminal device such as a smartphone, a tablet PC, and a notebook PC. The terminal 100 stores a user name UN1 for identifying a user who uses the printer 10.

The terminal 100 is provided with an Internet Printing Protocol (IPP) program (not shown) installed from a server on the Internet. The IPP program is a program configured to create an IPP command according to Hyper Text Transfer Protocol (HTTP) and send this command to the printer 10. In the present embodiment, the aforementioned server is provided by an entity different from a vendor of the printer 10. However, in a variant, the aforementioned server may be provided by the vendor of the printer 10. The terminal 100 may be preconfigured to support IPP without installing the IPP program from the aforementioned server.

(Configuration of Printer 10)

The printer 10 is a peripheral device configured to execute a print process (i.e., a peripheral device of the terminal 100). The printer 10 is further configured to execute a web server function. The web server function is a function of sending webpage data corresponding to a webpage to an external device (such as the terminal 100) in response to the external device accessing a web server in the printer 10. The webpage is for example a page for managing settings of the printer 10 (such as settings for firmware and internet connection). The printer 10 may be a multi-function device configured to execute a scan process, a FAX process, and the like in addition to the print process and the web server function. The printer 10 is provided with an operation unit 12, a display unit 14, a print executing unit 16, a LAN interface (hereinbelow, an interface will be denoted "I/F") 20, and a controller 30.

The operation unit 12 is provided with a plurality of keys. The user can input various instructions to the printer 10 by operating the operation unit 12. The display unit 14 is a display configured to display various types of information.

The display unit 14 also functions as a so-called touch screen (i.e., an operation unit). The print executing unit 16 is a print mechanism of an inkjet scheme, a laser scheme, or the like. The LAN I/F 20 is connected to the LAN 4.

The controller 30 is provided with a CPU 32 and a memory 34. The CPU 32 is configured to execute various processes according to a program 40 stored in the memory 34. The memory 34 is configured of a volatile memory, a nonvolatile memory, and the like. The memory 34 stores a user table 42, a preset table 44, and a deletion flag 46.

The user table 42 stores, for each of one or more users who use the printer 10, a user name, a password, an access date and time, and a Get date and time in association with each other. The user name and the password are registered by an administrator of the printer 10. The access date and time indicates a latest date and time when a specific HTTP command to be described later was most recently received. The Get date and time indicates a latest date and time when a Get-Printer-Attributes command (hereinbelow denoted "GPA") being a type of the IPP command was most recently received.

Here, the "specific HTTP command" is a HTTP command including a user name and a password. In other words, the "specific HTTP command" is a HTTP command including an instruction to execute authentication using the user name and the password. For example, the authentication using the user name and the password is executed upon when the web server in the printer 10 is accessed. Further, the authentication using the user name and the password is also executed when preset data in the preset table 44 is to be obtained. For example, a management screen request for accessing the web server in the printer 10 (see FIG. 8) and the GPA being one type of the IPP command are examples of the "specific HTTP command".

For example, in a case where the GPA is received, the printer 10 stores a date and time when the GPA was received as the access date and time and the Get date and time in the user table 42. On the other hand, in a case where the management screen request is received, the printer 10 stores a date and time when the management screen request was received as the access date and time in the user table 42 but does not store this date and time as the Get date and time in the user table 42.

The preset table 44 stores each preset data in association with a user name. The preset data includes a preset name identifying this preset data and setting data of the preset data. The setting data includes a plurality of setting values corresponding to a plurality of setting items (such as the number of colors, the number of copies, an image quality, and a size) for executing the print process.

Further, the preset table 44 stores an executed date and time and a stored date and time in association with each preset data. The executed date and time indicates a date and time when printing using the preset data is estimated as having been executed. The stored date and time indicates a date and time when the preset data was stored in the preset table 44.

The deletion flag 46 indicates one of "ON", indicating that execution of a main process of automatic deletion to be described later (see FIG. 5) is allowed, and "OFF", indicating that the execution of the main process of automatic deletion is not allowed. A default value of the deletion flag 46 is "OFF". The deletion flag 46 is set by the user.

Figure 2:
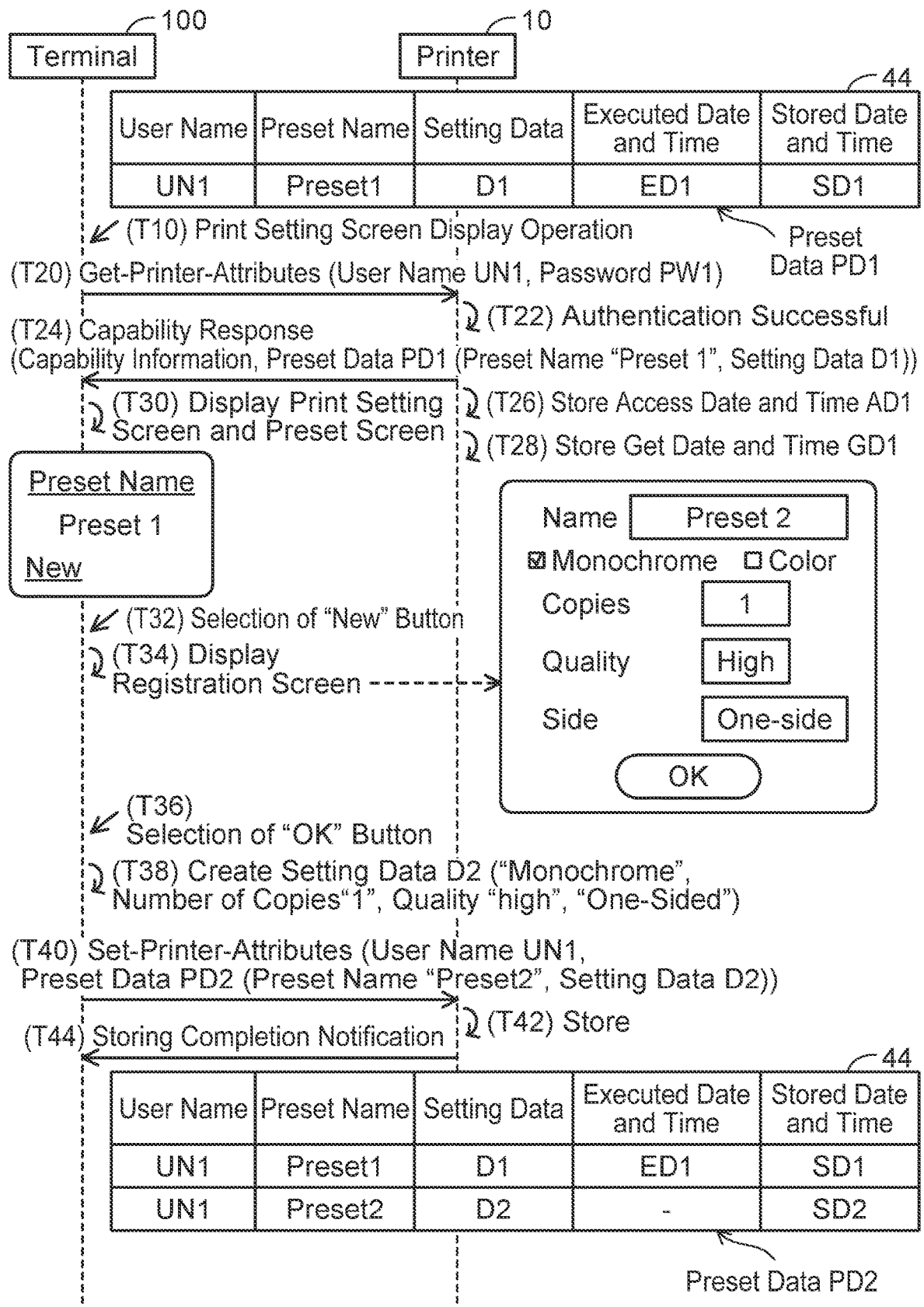
FIG. 2 shows a sequence diagram of a process of storing preset data.

(Storing New Preset Data; FIG. 2)

A process of storing new preset data PD2 will be described with reference to FIG. 2. In an initial state of FIG. 2, the preset table 44 stores preset data PD1 (i.e., a preset name "Preset1" and setting data D1) in association with the user name UN1. Hereinbelow, unless particularly mentioned to the contrary, processes executed by the CPU 32 of the printer 10 will be described with the printer 10 as a subject of action instead of describing the CPU 32 as the subject of action for easier understanding. Further, hereinbelow, the printer 10 and the terminal 100 communicate through the LAN 4 and the LAN I/F 20. Hereinbelow, unless particularly mentioned to the contrary, phrases "via the LAN 4" and "via the LAN I/F 20" will be omitted.

When accepting an operation for displaying a print setting screen for inputting setting values of the print process in T10, the terminal 100 sends a GPA according to the IPP (i.e., Get-Printer-Attributes command) to the printer 10 in T20. The GPA includes a capability obtainment request for obtaining capability information indicating all print conditions which the printer 10 is configured to execute (such as "monochrome", "color", "one-sided", "flip on long edge", and "flip on short edge") and a data obtainment request for obtaining preset data. The GPA further includes the user name UN1 and the password PW1. The GPA may in some cases include the capability obtainment request but not the data obtainment request. Hereinbelow, unless particularly mentioned to the contrary, the GPA is assumed as including both the capability obtainment request and the data obtainment request.

When receiving the GPA from the terminal 100 in T20, the printer 10 executes authentication of the user name UN1 and the password PW1 in the GPA in T22. In a case shown in FIG. 2, the authentication of the user name UN1 and the password PW1 succeeds. If the GPA does not include one of or both of the user name and the password, the printer 10 sends a screen request for causing the terminal 100 to display the input screen for inputting the user name and the password to the terminal 100.

When the authentication of the user name UN1 and the password PW1 succeeds in T22, the printer 10 identifies the preset data PD1 associated with the user name UN1 from the preset table 44. Then, in T24, the printer 10 sends a capability response being a response to the GPA to the terminal 100. The capability response includes the capability information and the identified preset data PD1.

Further, in T26, the printer 10 stores a current date and time (i.e., a date and time when the GPA in T20 was received) as an access date and time AD1 in the user table 42, and then in T28, stores this current date and time as a Get date and time in the user table 42. Process of T26 may be executed after process of T28. Further, in another example, the processes of T26 and T28 may be executed before process of T24.

When receiving the capability response from the printer 10 in T24, the terminal 100 displays the print setting screen (omitted from drawings) and a preset screen in T30. The print setting screen includes input boxes for inputting setting values corresponding to the capability information included in the capability response. The preset screen includes a list of registered preset data and a "New" button for registering new preset data. At this timing, the list includes the preset name "Preset1" associated with the user name UN1.

In T32, the terminal 100 accepts user's selection of the "New" button. In T34, the terminal 100 displays a registration screen for registering the new preset data. The registration screen includes a preset name input box for inputting the preset name, a plurality of setting input boxes for inputting setting values corresponding to the capability information included in the capability response, and an "OK" button. For example, the plurality of setting value input boxes includes a box for inputting the number of colors, a box for inputting the number of copies, a box for inputting the image quality, and a box for inputting printing side(s). In the registration screen, a value may be inputted in at least one of the plurality of setting value input boxes. In the present case, the user inputs a preset name "Preset2", the number of colors "monochrome", the number of copies "1", the image quality "High", and the printing side(s) "one-sided" in the registration screen. Then, the user selects the "OK" button in T36.

In T38, the terminal 100 creates setting data D2 including the inputted setting values (i.e., the number of colors "monochrome", the number of copies "1", the image quality "High", and the printing side(s) "one-sided").

In T40, the terminal 100 sends a Set-Printer-Attributes command according to the IPP (hereinbelow denoted "SPA") to the printer 10. The SPA is a command for requesting the printer 10 to register preset data. This SPA includes the user name UN1 and the preset data PD2. The preset data PD2 includes the preset name "Preset2" inputted in the registration screen and the setting data D2.

When receiving the SPA from the terminal 100 in T40, the printer 10 stores the preset data PD2 in the SPA in the preset table 44 in association with the user name UN1 in the SPA in T42. Further, the printer 10 stores a current date and time in the user table 42 as stored date and time SD2 being a date and time when the preset data PD2 was stored.

In T44, the printer 10 sends to the terminal 100 a storing completion notification indicating that the preset data PD2 identified by the preset name "Preset2" has been stored in the printer 10.

Figure 3:
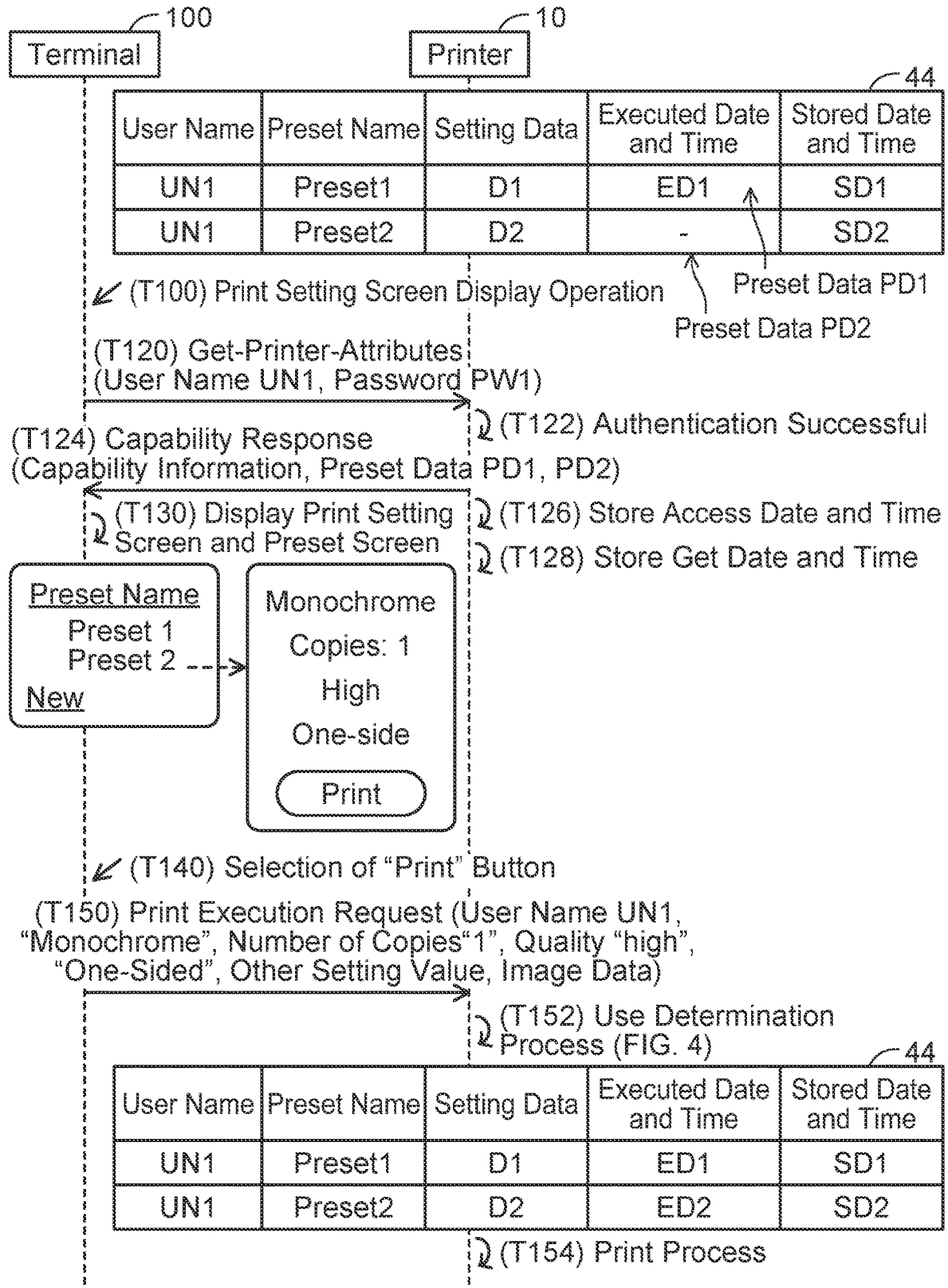
FIG. 3 shows a sequence diagram of a process of executing printing using the preset data.

(Printing; FIG. 3)

Printing executed using preset data will be described with reference to FIG. 3. The present case is a continuation of FIG. 2. In an initial state of the present case, two pieces of preset data PD1, PD2 are stored in the preset table 44.

T100 to T130 are similar to T10 to T30 of FIG. 2. In the present case, the list in the preset screen includes the preset names "Preset1", "Preset2" corresponding to the preset data PD1, PD2, respectively. The user selects the preset name "Preset2" in the list displayed in the preset screen. In this case, the terminal 100 displays a print screen including a "Print" button for accepting an instruction to execute printing. The print screen further includes the number of colors "monochrome", the number of copies "1", the image quality "High", and the printing side(s) "one-sided" indicated by the preset data PD2 with the preset name "Preset2". Due to this, the user can confirm the setting values stored as the preset name "Preset2". Although details will be omitted, the setting values in the print screen can be changed. Further, in the print screen, setting item(s) (such as a size) different from the setting items indicated by the preset data PD2 may be set additionally.

In T140, the terminal 100 accepts a selection of the "Print" button in the print screen. In T150, the terminal 100 sends a print execution request requesting printing of a print target image to the printer 10. The print execution request includes the user name UN1, the four setting values indicated by the preset data PD2 (i.e., the number of colors "monochrome", the number of copies "1", the image quality "High", and the printing side(s) "one-sided"), one or more other setting values, and image data corresponding to the print target image. The one or more other setting values (such as a size "A4") are setting values different from the four setting values indicated by the preset data PD2. Each of the one or more other setting values may for example be a setting value additionally set by the user or a default value in the printer 10. The default value is included for example in the capability response of T124. In a variant, the print execution request may not include the one or more other setting values.

Further, the print execution request does not include the preset name "Preset2". Due to this, the printer 10 cannot acknowledge that the preset name "Preset2" was selected in the preset screen, that is, that the preset data PD2 was used.

When receiving the print execution request from the terminal 100 in T150, the printer 10 executes a use determination process to be described later (see FIG. 4) in T152. The use determination process is a process for determining whether printing using the preset data selected by the user is to be executed. In the present case, the printer 10 determines in the use determination process that the printing using the preset data PD2 is to be executed, and stores a current date and time in the preset table 44 as an executed date and time ED2 of the preset data PD2.

In T154, the printer 10 causes the print executing unit 16 to execute print process of the image corresponding to the image data included in the print execution request according to the plurality of setting values included in the print execution request.

Figure 4:
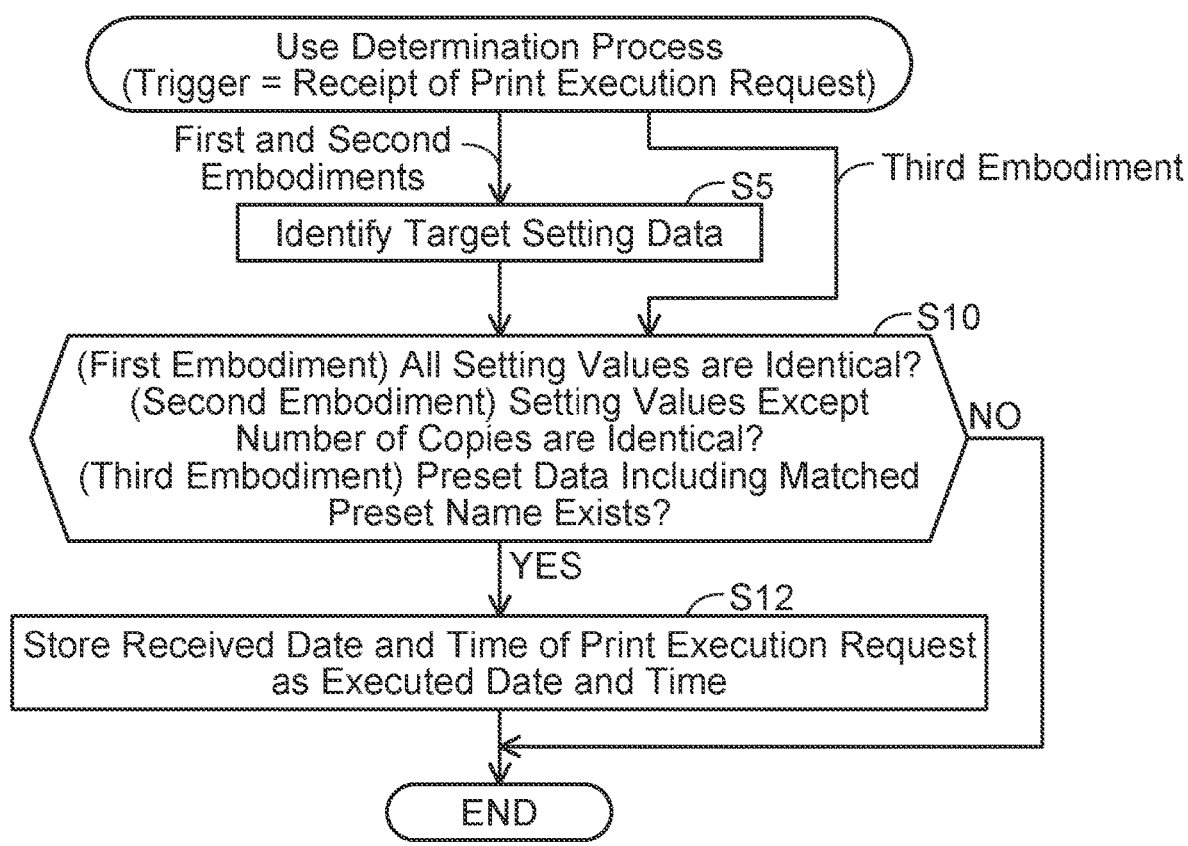
FIG. 4 shows a flowchart of a use determination process.

(Use Determination Process; FIG. 4)

The use determination process executed by the CPU 32 of the printer 10 will be described with reference to FIG. 4. A process of FIG. 4 is initiated with receipt of the print execution request as a trigger.

In S5, the CPU 32 identifies, from the preset table 44, N1 pieces of setting data (N1 being an integer of 1 or more) stored in association with the user name included in the print execution request. Then, the CPU 32 identifies, from the specified N1 pieces of setting data, N2 pieces of target setting data (N2 being an integer of 1 or more and N1 or less) being setting data to be determined in S10 which will be described later. Here, all the setting items indicated by the target setting data are included in the plurality of setting items indicated by the print execution request. In other words, all the setting items indicated by the target setting data are identical to a part of the plurality of setting items indicated by the print execution request. That is, the CPU 32 determines, for each of the identified N1 pieces of setting data, whether all the setting items indicated by the setting data are identical to a part of the plurality of setting items indicated by the print execution request. Then, the CPU 32 identifies the setting data, of which setting items were determined as being identical, as the target setting data. On the other hand, the CPU 32 does not identify the setting data, of which setting items were determined as not being identical, as the target setting data.

In S10, the CPU 32 selects one piece of target setting data from the identified N2 pieces of target setting data. Then, the CPU 32 determines whether all the setting values included in the selected one piece of target setting data are identical to a part of the plurality of setting values included in the print execution request. All the setting values included in the selected one piece of target setting data being identical to a part of the plurality of setting values included in the print execution request means that it is highly likely that this print execution request is a request that was sent due to the setting data (i.e., the preset data) having been selected by the user. For example, in the case of FIG. 3, the four setting values included in the setting data D2 (i.e., the number of colors "monochrome", the number of copies "1", the image quality "High", and the printing side(s) "one-sided") are identical to the four setting values among the plurality of setting values included in the print execution request of T150 (i.e., the number of colors "monochrome", the number of copies "1", the image quality "High", and the printing side(s) "one-sided"). Due to this, the CPU 32 determines YES in S10 and proceeds to S12. On the other hand, in a case where all the setting values included in the selected one piece of target setting data are not identical to the part of the plurality of setting values included in the print execution request, the CPU 32 selects another piece of target setting data from the N2 pieces of target setting data. That is, the CPU 32 executes the determination as above for each of the N2 pieces of target setting data. Then, in a case of determining, for all of the N2 pieces of target setting data, that all the setting values included in respective pieces of the target setting data are not identical to the part of the plurality of setting values included in the print execution request (NO in S10), the CPU 32 skips S12 and terminates the process of FIG. 4.

In a variant, there may be setting data A indicating only setting items identical to all the setting items indicated by the print execution request. In other words, all the setting items indicated by the print execution request may be identical to all the setting items indicated by the setting data A. In this case, the setting data A is identified as the aforementioned target setting data.

Further, in another variant, there may be setting data B indicating more setting items than all the setting items indicated by the print execution request. In this case, the setting data B is not identified as the aforementioned target setting data. In yet another variant, the setting data B may be identified as the aforementioned target setting data in a case where a part of all the setting items indicated by the setting data B is identical to all the setting items indicated by the print execution request.

In S12, the CPU 32 stores a current date and time (i.e., a date and time when the print execution request was received) in the preset table 44 as the executed date and time in association with the target setting data determined as being identical in S10. When the process of S12 is completed, the process of FIG. 4 is terminated.

Figure 5:
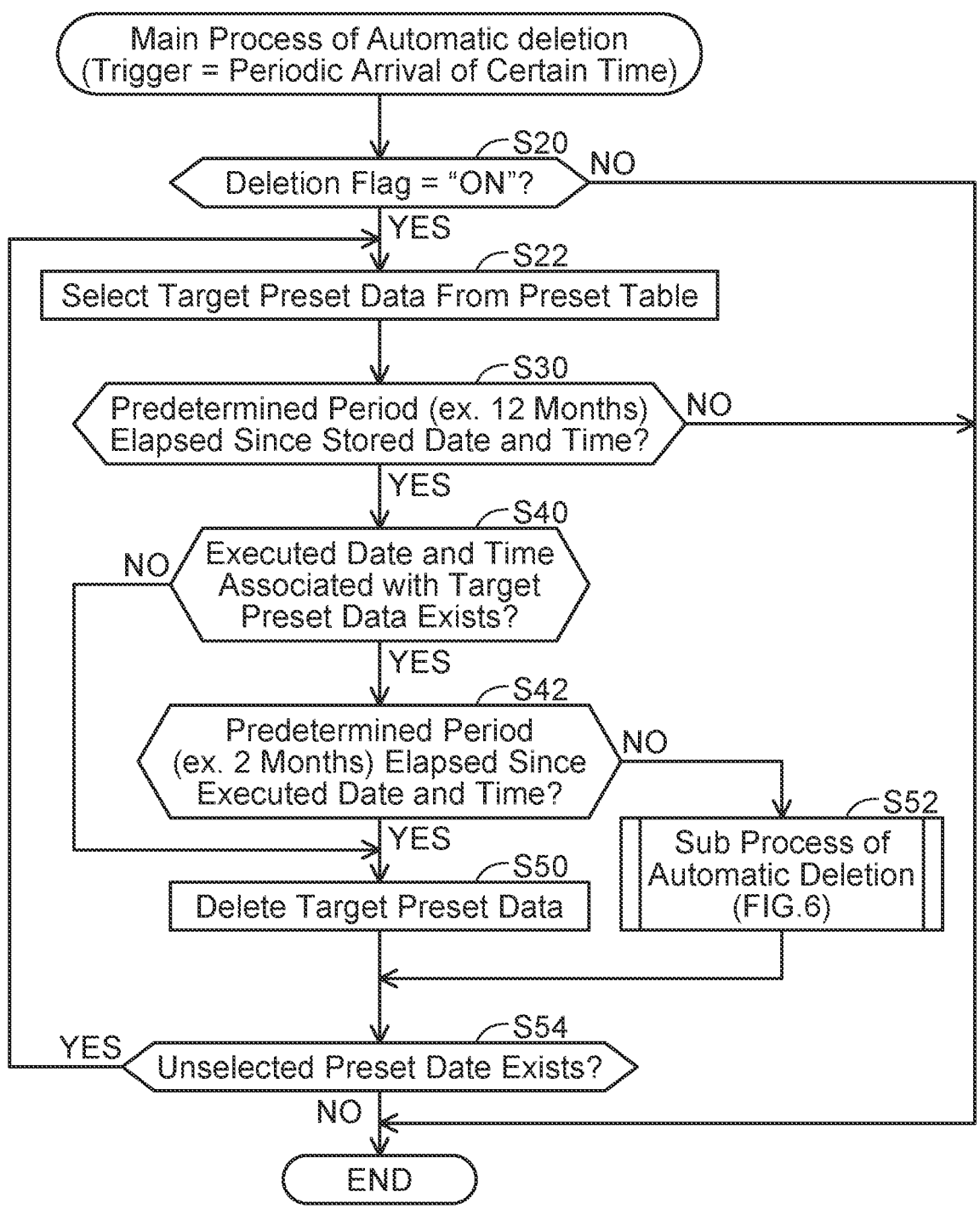
FIG. 5 shows a flowchart of a main process of automatic deletion.

(Main Process of Automatic Deletion; FIG. 5)

A main process of automatic deletion executed by the CPU 32 of the printer 10 will be described with reference to FIG. 5. The main process of automatic deletion is a process for automatically deleting unused preset data from the memory 34. The process of FIG. 5 is initiated with an arrival of a certain time (e.g., 17:00 every Friday) as a trigger.

In S20, the CPU 32 determines whether the deletion flag 46 in the memory 34 indicates "ON". The CPU 32 proceeds to S22 in a case of determining that the deletion flag 46 indicates "ON" (YES in S20). On the other hand, in a case of determining that the deletion flag 46 indicates "OFF" (NO in S20), the CPU 32 skips processes from S22 and terminates the process of FIG. 5. According to this configuration, the user can select whether to automatically delete unused preset data by setting the deletion flag 46. User convenience can thereby be improved.

In S22, the CPU 32 selects from the preset table 44 target preset data that is to be a target of processes from S30.

In S30, the CPU 32 determines whether a period difference between the stored date and time of the target preset data and the current date and time exceeds a predetermined period (e.g., 12 months). This period difference can be said as being a period that has elapsed since when the target preset data was stored. The CPU 32 skips processes from S40 and terminates the process of FIG. 5 in a case of determining that the period difference between the stored date and time and the current date and time does not exceed the predetermined period (NO in S30). According to this configuration, preset data that has been stored only for a relatively short period of time has elapsed since it was stored can be prevented from being automatically deleted.

Further, the CPU 32 proceeds to S40 in a case of determining that the period difference between the stored date and time and the current date and time exceeds the predetermined period (YES in S30). In S40, the CPU 32 determines whether an executed date and time stored in association with the target preset data exists. In a case of determining that an executed date and time stored in association with the target preset data does not exist (NO in S40), the CPU 32 determines that printing using the target preset data has never been executed, and proceeds to S50.

In S50, the CPU 32 deletes the target preset data from the preset table 44.

In following S54, the CPU 32 determines whether unselected preset data exists in the preset table 44. The CPU 32 returns to S22 in a case of determining that unselected preset data exists in the preset table 44 (YES in S54). On the other hand, the CPU 32 terminates the process of FIG. 5 in a case of determining that all the preset data in the preset table 44 has been selected (NO in S54).

Further, the CPU 32 proceeds to S42 in a case of determining that the executed date and time stored in association with the target preset data exists (YES in S40). In S42, the CPU 32 determines whether a period difference between the executed date and time stored in association with the target preset data and a current date and time exceeds a predetermined period (e.g., 2 months). In a case of determining that the period difference between the executed date and time and the current date and time exceeds the predetermined period (YES in S42), the CPU 32 determines that, although printing using the target preset data had been executed, the non-use period of the target preset data exceeded the predetermined period, and proceeds to S50.

Further, in a case of determining that the period difference between the executed date and time and the current date and time does not exceed the predetermined period (NO in S42), the CPU 32 executes a sub process of automatic deletion (see FIG. 6) to be described later in S52. When the process of S52 is completed, the CPU 32 proceeds to S54.

Figure 6:
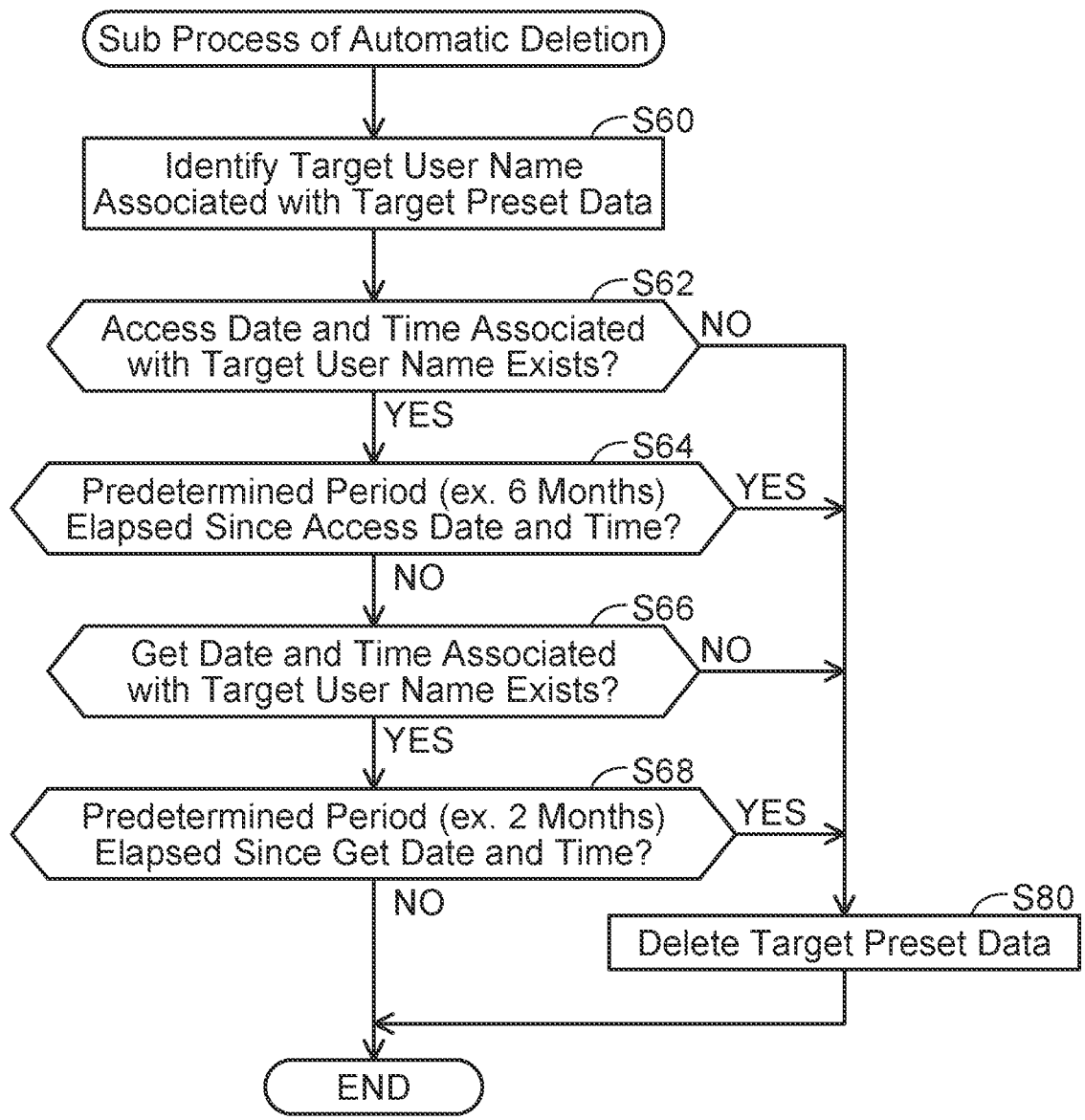
FIG. 6 shows a flowchart of a sub process of automatic deletion.

(Sub Process of Automatic Deletion; FIG. 6)

A sub process of automatic deletion will be described with reference to FIG. 6. In S60, the CPU 32 identifies a user name stored in association with the target preset data (hereinbelow denoted as "target user name").

In S62, the CPU 32 determines whether an access date and time stored in association with the target user name exists. In a case of determining that an access date and time stored in association with the target user name does not exist (NO in S62), the CPU 32 determines that a specific HTTP command including the target user name has never been received since when the target preset data was stored (i.e., the authentication of the target user name has never been executed) and proceeds to S80. S80 is similar to S50 of FIG. 5. When S80 is completed, the process of FIG. 6 is terminated.

In a case of determining that an access date and time stored in association with the target user name exists (YES in S62), the CPU 32 proceeds to S64. In S64, the CPU 32 determines whether a period difference between the access date and time stored in association with the target user name and a current date and time exceeds a predetermined period (e.g., 6 months). In a case of determining that the period difference between the access date and time and the current date and time exceeds the predetermined period (YES in S64), the CPU 32 determines that the authentication of the target user name has never been executed over a long period of time since when the specific HTTP command including the target user name was received, and proceeds to S80. Such a situation may for example be a situation in which the target user name has already been deleted from the user table 42.

Further, in a case of determining that the period difference between the access date and time and the current date and time does not exceed the predetermined period (NO in S64), the CPU 32 proceeds to S66. In S66, the CPU 32 determines whether a Get date and time stored in association with the target user name exists. In a case of determining that a Get date and time stored in association with the target user name does not exist (NO in S66), the CPU 32 determines that a GPA including the target user name has never been received since when the target preset data was stored (i.e., the target preset data has never been received by the terminal 100) and proceeds to S80.

Further, in a case of determining that a Get date and time stored in association with the target user name exists (YES in S66), the CPU 32 proceeds to S68. In S68, the CPU 32 determines whether a period difference between the Get date and time stored in association with the target user name and a current date and time exceeds a predetermined period (e.g., 2 months). Here, the predetermined period in S68 is shorter than the predetermined period in S64. In a case of determining that the period difference between the Get date and time and the current date and time exceeds the predetermined period (YES in S68), the CPU 32 determines that the target preset data has not been obtained again over a long period of time since when the target preset data was obtained by the terminal 100, and proceeds to S80.

Further, in a case of determining that the period difference between the Get date and time and the current date and time does not exceed the predetermined period (NO in S68), the CPU 32 terminates the process of FIG. 6.

Figure 7:
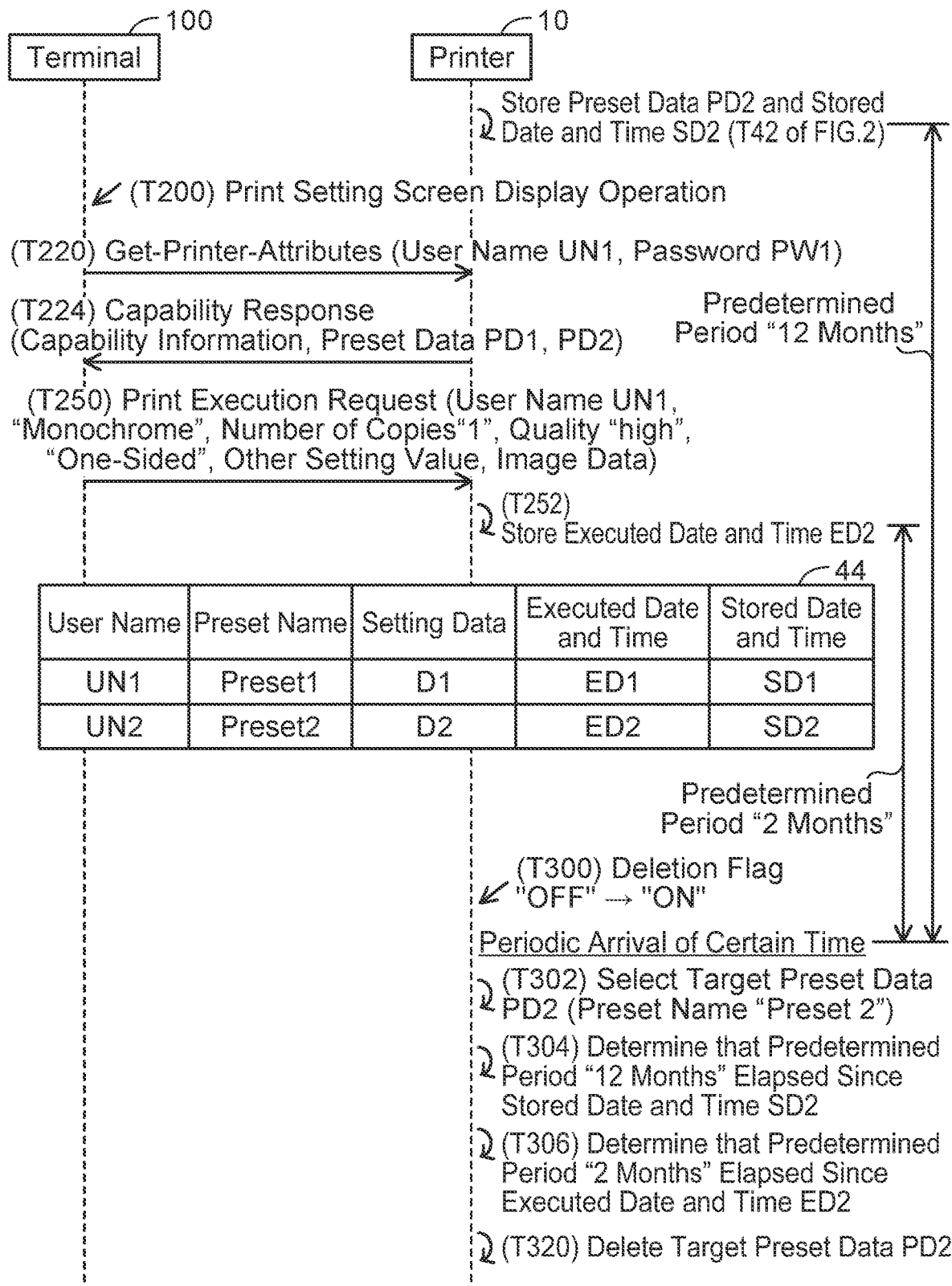
FIG. 7 shows specific Case A1.

(Specific Case A1; FIG. 7)

Specific Case A1 realized by the processes of FIGS. 4 to 6 will be described with reference to FIG. 7. The present case is a continuation of FIG. 3.

T200 to T252 are similar to T100 to T152 of FIG. 3. In T300, the user operates the operation unit 12 of the printer 10 and sets the deletion flag 46 to "ON". Then, in the present case, a period of "2 months" has elapsed since when the executed date and time ED2 was stored in T252 without printing using the preset data PD2 being executed. Further, in the present case, a period of "12 months" has elapsed since when the preset data PD2 was stored (i.e., since the date and time indicated by the stored date and time SD2). Then, the main process of automatic deletion is executed with the periodic arrival of the certain time as a trigger.

In T302, the printer 10 selects the preset data PD2 as the target preset data (S22 of FIG. 5). In T304, the printer 10 determines that a period difference from the stored date and time SD2 exceeds the predetermined period of "12 months" (YES in S30). In T306, the printer 10 determines that a period difference from the executed date and time ED2 exceeds the predetermined period of "2 months" (YES in S42). In T320, the printer 10 deletes the preset data PD2 (S50).

According to this configuration, the printer 10 estimates that printing using the preset data PD2 has not been executed for more than the predetermined period of "2 months" since when the printing using the preset data PD2 was last executed, and deletes from the memory 34 the preset data PD2 of which non-use period exceeds the predetermined period. A capacity of the memory 34 of the printer 10 is limited. According to the above configuration, a data size of the preset data (i.e., setting data) in the memory 34 can be prevented from unnecessarily becoming large.

(Specific Case A2; FIG. 8)

Specific Case A2 realized by the processes of FIGS. 4 to 6 will be described with reference to FIG. 8. The present case is a continuation of FIG. 3.

T400 to T428 are similar to T100 to T128 of FIG. 3. Then, in T500, the terminal 100 sends a top screen request to the printer 10. The top screen request is a HTTP command for requesting top screen data. The top screen data is webpage data corresponding to a top screen for accessing the web server in the printer 10. The top screen request includes the IP address of the printer 10.

When receiving the top screen request from the terminal 100 in T500, the printer 10 sends the top screen data to the terminal 100 in T502.

When receiving the top screen data from the printer 10 in T502, the terminal 100 displays the top screen. The top screen includes input boxes for inputting a user name and a password. In T504, the terminal 100 accepts inputs of the user name UN1 and the password PW1. Then, in T506, the terminal 100 sends a management screen request including the user name UN1 and the password PW1 to the printer 10. The management screen request is a HTTP command for requesting management screen data. The management screen data is webpage data corresponding to a management screen for managing the settings of the printer 10. That is, the management screen request is a specific HTTP command.

When receiving the management screen data from the terminal 100 in T506, the printer 10 executes authentication of the user name UN1 and the password PW1 in the management screen data in T522. In Case A2 of FIG. 8, the authentication of the user name UN1 and the password PW1 succeeds. Then, in T524, the printer 10 sends the management screen data to the terminal 100.

Further, in T526, the printer 10 stores a current date and time (i.e., a date and time when the management screen request in T506 was received) as the access date and time AD1 in the user table 42. That is, the access date and time AD1 is updated from the date and time in T426 to the date and time in T526. Here, the printer 10 does not store this current date and time as the Get date and time in the user table 42. That is, the Get date and time GD1 is maintained to be the date and time in T428.

T600 that follows is similar to T300 of FIG. 7. Then, in the present case, a period of "2 months" has elapsed without receiving a GPA since when the Get date and time GD1 was stored in T428. Further in the present case, a period of "1 month" has elapsed since when the access date and time AD1 was stored in T526 (i.e., the date and time indicated by the access date and time AD1). Then, the main process of automatic deletion is executed with the periodic arrival of the certain time as the trigger.

In T602, the printer 10 selects the preset data PD2 as the target preset data (S22 of FIG. 5). In T604, the printer 10 determines that a period difference from the stored date and time SD2 exceeds the predetermined period of "12 months" (YES in S30). For example, a situation may be assumed in which the terminal 100 receives the capability information from the printer 10 by sending a GPA including the capability obtainment request but not including the data obtainment request, displays the print setting screen, and sends the print execution request including the setting values inputted in the print setting screen in a period between the timing of T428 and a current time point. In this situation, the executed date and time ED2 could be updated during the period between the timing of T428 and the current time point due to an erroneous estimation made in the use determination process of FIG. 4 that printing using the preset data PD2 was executed despite the data obtainment request not having been received. In such a situation, the printer 10 determines in T606 that the period difference from the executed date and time ED2 does not exceed the predetermined period of "2 months" (NO in S42).

In T608, the printer 10 determines that the period difference of "1 month" from the access date and time AD2 does not exceed the predetermined period of "6 months" (NO in S64). In T610, the printer 10 determines that the period difference from the Get date and time GD1 exceeds the predetermined period of "2 months" (YES in S68). In T620, the printer 10 deletes the preset data PD2 (S80).

According to this configuration, the printer 10 determines that the target preset data has not been obtained again before the predetermined period of "2 months" elapsed since the target preset data was last obtained by the terminal 100, and deletes from the memory 34 the preset data PD2 of which non-use period exceeds the predetermined period. The data size of the preset data (i.e., setting data) in the memory 34 can be prevented from unnecessarily becoming large.

Further, according to this configuration, the printer 10 can determine that it is highly likely that the preset data PD2 has not been obtained by the terminal 100 although the authentication of the user name UN1 and the password PW1 was recently executed, and can delete from the memory 34 the preset data PD2 of which non-use period exceeds the predetermined period.

Further, according to this configuration, the printer 10 can determine that it is highly likely that the preset data PD2 has not been obtained by the terminal 100 even when the printing using the preset data PD2 was erroneously estimated as having been executed, and can delete from the memory 34 the preset data PD2 of which non-use period exceeds the predetermined period.

(Corresponding Relationship)

The printer 10, the print executing unit 16, and the memory 34 are respectively an example of "image processing device", "image processing execution unit", and "memory". The terminal 100 is an example of "first terminal device (and second terminal device)". The deletion flag 46 is an example of "deletion flag". The specific HTTP command, and the GPA including the data obtainment request are respectively an example of "specific request" and "obtainment request". The setting data D2 corresponding to the preset name "Preset2" in T130 of FIG. 3 is an example of "specific setting data". The four setting values indicated by the preset data PD2 in T150 of FIG. 3 (i.e., the number of colors "monochrome", the number of copies "1", the image quality "High", and the printing side(s) "one-sided") are examples of "related information". The Get date and time is an example of "receipt information (and first type of the received date-and-time information)". The access date and time is an example of "second type of the received date-and-time information". The predetermined period in S68 and the predetermined period in S64 of FIG. 6 are respectively an example of "first type of the predetermined period" and "second type of the predetermined period". The executed date and time is an example of "selection information (and execution date-and-time information)". The predetermined period in S42 of FIG. 5 is an example of "third type of the predetermined period". The predetermined period in S30 is an example of "specific period". The user name UN1 and the password PW1 are examples of "first user information".

T124, T150, and T154 of FIG. 3 are respectively an example of "send to the first terminal device at least one piece of setting data", "receive from the first terminal device an execution request", and "cause the image processing execution unit to execute the image processing". The main process of automatic deletion of FIG. 5 is an example of "determine whether target setting data exists in the plurality of pieces of setting data stored in the memory". S50 of FIG. 5 and S80 of FIG. 6 are examples of "delete the target setting data from the memory".

Second Embodiment

The present embodiment is similar to the first embodiment except that contents of the use determination process are different.

(Use Determination Process; FIG. 4)

The use determination process of the present embodiment is similar to that of the first embedment except a content of the determination of S10 is different.

In S10, the CPU 32 selects one piece of target setting data from the N2 pieces of target setting data identified in S5. Then, the CPU 32 determines whether one or more setting values excluding a specific setting value among all the setting values included in the selected piece of target setting data are identical to one or more setting values excluding a specific setting value among all or a part of the plurality of setting values included in the print execution request. Then, similar to the first embodiment, the CPU 32 executes the above determination for each of the N2 pieces of target setting data. Here, the "specific setting value" may for example be a setting value corresponding to the setting item "number of copies". For example, in the case of FIG. 3, a situation may be assumed in which the number of copies "1" in the print screen (see T130 of FIG. 3) is changed to the number of copies "2". In this situation, the three setting values excluding the number of copies "1" included in the setting data PD2 (i.e., the number of colors "monochrome", the image quality "High", and the printing side(s) "one-sided") are identical to the three setting values excluding the number of copies "2" included in the print execution request of T150 (i.e., the number of colors "monochrome", the image quality "High", and the printing side(s) "one-sided"). Due to this, the CPU 32 determines YES in S10 and proceeds to S12.

The setting value corresponding to the setting item "number of copies" is a setting value which is highly likely to be changed by the user. Even if the setting value which may be highly likely to be changed by the user is not identical, the setting values other than this setting value being identical means that it is highly likely that the received print execution request is a request sent due to the preset data having been selected by the user. Although it may be erroneously determined that printing using the preset data selected by the user has not been executed when the setting value which may be highly likely to be changed by the user is not identical, the above configuration can prevent such an erroneous determination.

(Corresponding Relationship)

The setting value corresponding to the setting item "number of copies" is an example of "specific setting value(s)". In a variant, the "specific setting value(s)" may be a setting value corresponding to another setting item (e.g., the number of colors, the image quality, the printing side(s), and a size).

Third Embodiment

The present embodiment is similar to the first embodiment except that contents of the use determination process are different.

(Use Determination Process; FIG. 4)

The use determination process of the present embodiment is similar to that of the first embedment except that the process of S5 is not executed and the content of the determination of S10 is different.

Further, in the present embodiment, the print execution request includes the preset name (e.g., "Preset2") selected in the preset screen (see T130 of FIG. 3). In the present embodiment, the print request may not include the setting values. Specifically, the print execution request may or may not include the one or more setting values (i.e., the four setting values, namely the number of colors "monochrome", the number of copies "1", the image quality "High", and the printing side(s) "one-sided" corresponding to the preset name "Preset2") corresponding to the selected preset name (e.g., "Preset2"). Further, the print execution request may or may not include a setting value(s) different from the one or more setting values corresponding to the selected preset name (i.e., a setting value (e.g., a size "A4") different from the four setting values corresponding to the preset name "Preset2").

In S10, the CPU 32 determines whether preset data stored in association with both the user name and the preset name included in the print execution request exists. The CPU 32 proceeds to S12 in a case of determining that preset data stored in association with both the user name and the preset name included in the print execution request exists (YES in S10). On the other hand, the CPU 32 skips S12 and terminates the process of FIG. 4 in a case of determining that preset data stored in association with both the user name and the preset name included in the print execution request does not exist (NO in S10).

The preset name being included in the print execution request means that the preset data identified by this preset name has been selected by the user. With the configuration of the present embodiment as well, similar to the first embodiment, it can be determined whether the printing using the preset data selected by the user has been executed. The preset name is an example of "identification information". Further, the preset name is an example of "related information".

(Variant 1) The "image processing" is not limited to the print process, and may for example be a scan process. The image processing execution unit" is not limited to the print executing unit 16, and may for example be a scan mechanism such as CCD and CIS. In this case, the "setting data" may include a plurality of setting values corresponding to a plurality of setting items for executing the scan process (e.g., an image quality, a data format, and a size).

(Variant 2) The determination in S20 of FIG. 5 may not be executed. In the present variant, the "deletion flag" may be omitted.

(Variant 3) In the embodiments as above, the printer 10 stores the access date and time and the Get date and time (e.g., T26 and T28 of FIG. 2). Instead of this, the printer 10 may store, in a case where a GPA is received, a first receipt flag which indicates that the GPA was received in association with the user name UN1 in the memory 34, and may store in the memory 34 a second receipt flag indicating that the specific HTTP command was received. Moreover, the printer 10 may not store the first receipt flag and may store the second receipt flag in the memory 34 in a case where the management screen request is received. Further, the first receipt flag may automatically be deleted when a predetermined period (e.g., 2 months) elapses, and the second receipt flag may automatically be deleted when a predetermined period (e.g., 6 months) elapses. In this case, the printer 10 may determine NO in S64 of FIG. 6 in a case where the second receipt flag is stored in the memory 34 while determine YES in a case where the second receipt flag is not stored in the memory 34. Further, the printer 10 may determine NO in S68 of FIG. 6 in a case where the first receipt flag is stored in the memory 34 while determine YES in a case where the first receipt flag is not stored in the memory 34. According to the present variant, the first receipt flag and the second receipt flag are examples of the "receipt information".

(Variant 4) The GPA (see T420 of FIG. 8) and the management screen request (see T506) may include the user name UN1 but may not include the password PW1. That is, in the printer 10, the authentication using the password PW1 may not be executed. According to the present variant, the user name UN1 is an example of the "first user information".

(Variant 5) Neither the access date and time nor the Get date and time may be stored. Further, S52 of FIG. 5 (i.e., the sub process of automatic deletion) may not be executed. In the present variant, "store receipt information" may be omitted.

(Variant 6) In the embodiments as above, the access date and time and the Get date and time are stored. Instead of this, only the Get date and time may be stored. Further, the determination in S68 may be executed while the determination in S64 is not executed in FIG. 6. According to the present variant, the "second type of the received date-and-time information" may be omitted.

(Variant 7) In the embodiments as above, the access date and time and the Get date and time are stored. Instead of this, only the access date and time may be stored. Further, the determination in S64 may be executed while the determination in S68 may not be executed in FIG. 6. According to the present variant, the access date and time is an example of the "receipt information (and first type of the received date-and-time information)".

(Variant 8) The specific HTTP command in the embodiments as above is not limited to the GPA and the management screen request, and may for example be a SPA or a GPA not including the data obtainment request. In this case, in a case of receiving the SPA and the GPA not including the data obtainment request, the printer 10 may store a current date and time as the access date and time but not store the current date and time as the Get date and time. In the present variant, the SPA and the GPA not including the data obtainment request are examples of "different request".

(Variant 9) In the embodiments as above, the printer 10 stores the executed date and time (S12 of FIG. 4). Instead of this, in the case of receiving the print execution request, the printer 10 may store, in the memory 34 in association with preset data, a selection flag indicating that this preset data was selected by the user. Further, a first selection flag may automatically be deleted in a case where a predetermined period (e.g., 2 months) elapses. In this case, the printer 10 may determine NO in S42 of FIG. 5 in a case where the selection flag is stored in the memory 34 while determine YES therein in a case where the selection flag is not stored in the memory 34. According to the present variant, the selection flag is an example of the "selection information".

(Variant 10) The processes of S40, S42, and S50 of FIG. 5 may not be executed. In this case, the printer 10 may execute the process of S52 in the case of determining YES in S30. In the present variant, "store selection information" may be omitted.

(Variant 11) The determination of S30 of FIG. 5 may not be executed. In the present variant, "stored date and time" may be omitted.

(Variant 12) The determinations in S40 of FIGS. 5, S62 and S66 of FIG. 6 may not be executed.

(Variant 13) In the above embodiments, the respective processes of FIGS. 2 to 8 are realized by a software (e.g., the program 40). Alternatively, one or more of the processes may be realized by hardware such as a logic circuit.

What is claimed is:

1. An image processing device comprising:
   an image processing execution unit configured to execute image processing;
   a memory configured to store a plurality of pieces of setting data related to the image processing; and
   a controller,
   wherein for each of one or more pieces of user information, the memory is further configured to store the user information and one or more pieces of setting data in association with each other, and
   the controller is configured to:
   in a case where an obtainment request is received from a first terminal device, send to the first terminal device at least one piece of setting data among the plurality of pieces of setting data stored in the memory;
   in a case where specific setting data is selected from among the at least one piece of setting data in the first terminal device after the at least one piece of setting data has been sent to the first terminal device, receive from the first terminal device an execution request for the image processing, the execution request including related information related to the specific setting data;
   in a case where the execution request is received from the first terminal device, cause the image processing execution unit to execute the image processing according to one or more setting values corresponding to the related information included in the execution request;
   receive a specific request including first user information from a second terminal device;
   in a case where the specific request is received from the second terminal device, store receipt information in the memory in association with the first user information, the receipt information indicating receipt of the specific request;
   determine whether target setting data associated with the first user information exists in the plurality of pieces of setting data stored in the memory based on the receipt information associated with the first user information, the target setting data being setting data of which non-use period exceeds a predetermined period; and
   in a case where it is determined that the target setting data exists, delete the target setting data from the memory.

2. The image processing device as in claim 1, wherein the memory is further configured to store a deletion flag indicating a flag value that is user-settable,
   the deletion flag indicates one of a first flag value indicating that deletion of setting data is allowable and a second flag value indicating that deletion of setting data is not allowable,
   in a case where it is determined that the target setting data exists and the deletion flag in the memory indicates the first flag value, the controller is configured to delete the target setting data from the memory, and
   in a case where the deletion flag in the memory indicates the second flag value, the target setting data is not deleted from the memory.

3. The image processing device as in claim 1, wherein the receipt information includes received date-and-time information indicating a date and time when the specific request was received, and
   the controller is configured to determine that the target setting data associated with the first user information exists in a case where a period difference between a date and time indicated by the received date-and-time information associated with the first user information and a current date and time exceeds a first type of the predetermined period.

4. The image processing device as in claim 3, wherein the specific request is any one of a plurality of requests including the obtainment request including the first user information and a different request being different from the obtainment request and including the first user information,
   in a case where the obtainment request is received as the specific request from the second terminal device, the controller is configured to store a first type of the received date-and-time information and a second type of the received date-and-time information in the memory, the first type of the received date-and-time information indicating a date and time when the obtainment request was received, the second type of the received date-and-time information indicating a date and time when any one of the plurality of requests was received,
   in a case where the different request is received as the specific request from the second terminal device, the controller is configured to store the second type of the received date-and-time information in the memory without storing the first type of the received date-and-time information in the memory,
   the controller is configured to determine that the target setting data associated with the first user information exists in a case where a period difference between a date and time indicated by the second type of the received date-and-time information associated with the first user information and a current date and time does not exceed a second type of the predetermined period and a period difference between a date and time indicated by the first type of the received date-and-time information associated with the first user information and a current date and time exceeds the first type of the predetermined period.

5. The image processing device as in claim 4, wherein the first type of the predetermined period is shorter than the second type of the predetermined period.

6. The image processing device as in claim 1, wherein the controller is further configured to:
   in a case where the execution request is received from the first terminal device, at least one item among a plurality of setting items indicated by the execution request is identical to all of one or more setting items indicated by one piece of setting data among the at least one piece of setting data, and one or more setting values corresponding to the at least one item are identical to one or more setting values corresponding to the all of one or more setting items indicated by the one piece of setting data, store selection information in the memory in association with the specific setting data which is the one piece of setting data, the selection information indicating that the specific setting data has been selected, and the controller is configured to determine whether the target setting data exists based on the selection information associated with the specific setting data.

7. The image processing device as in claim 6, wherein the selection information includes execution date-and-time information indicating a date and time when the execution request was received, and the controller is configured to determine that the specific setting data is the target setting data in a case where a period difference between a date and time indicated by the execution date-and-time information associated with the specific setting data and a current date and time exceeds a third type of the predetermined period.

8. The image processing device as in claim 1, wherein the controller is further configured to:

in a case where the execution request is received from the first terminal device, at least one item among a plurality of setting items indicated by the execution request is identical to all of one or more setting items indicated by one piece of setting data among the at least one piece of setting data, and one or more setting values excluding a specific setting value among two or more setting values corresponding to the at least one item are identical to one or more setting values excluding a specific setting value among two or more setting values corresponding to the all of one or more setting items indicated by the one piece of setting data, store selection information in the memory in association with the specific setting data which is the one piece of setting data, the selection information indicating that the specific setting data has been selected, and the controller is configured to determine whether the target setting data exists based on the selection information associated with the specific setting data.

9. The image processing device as in claim 8, wherein the selection information includes execution date-and-time information indicating a date and time when the execution request was received, and the controller is configured to determine that the specific setting data is the target setting data in a case where a period difference between a date and time indicated by the execution date-and-time information associated with the specific setting data and a current date and time exceeds a third type of the predetermined period.

10. The image processing device as in claim 1, wherein for each of the plurality of pieces of setting data, the memory is further configured to store the setting data and identification information for identifying the setting data in association with each other, the controller is configured to send the at least one piece of setting data and at least one piece of identification information corresponding to the at least one piece of setting data to the first terminal device, the execution request includes specific identification information for identifying the specific setting data, the controller is further configured to:

in a case where the execution request is received from the first terminal device and the specific identification information included in the execution request is identical to the identification information in the memory, store selection information in the memory in association with the specific setting data, the selection information indicating that the specific setting data has been selected, and the controller is configured to determine whether the target setting data exists based on the selection information associated with the specific setting data.

11. The image processing device as in claim 10, wherein the selection information includes execution date-and-time information indicating a date and time when the execution request was received, and the controller is configured to determine that the specific setting data is the target setting data in a case where a period difference between a date and time indicated by the execution date-and-time information associated with the specific setting data and a current date and time exceeds a third type of the predetermined period.

12. The image processing device as in claim 1, wherein the target setting data is not deleted from the memory in a case where a period elapsed after the target setting data was registered does not exceed a specific period even when the target setting data exists.

13. The image processing device as in claim 1, wherein each of the plurality of pieces of setting data is data according to an Internet Printing Protocol.

14. A non-transitory computer-readable recording medium storing computer-readable instructions for an image processing device, wherein the image processing device comprises:

a processor;

an image processing execution unit configured to execute image processing; and a memory configured to store a plurality of pieces of setting data related to the image processing, wherein for each of one or more pieces of user information, the memory is further configured to store the user information and one or more pieces of setting data in association with each other, and the computer-readable instructions, when executed by the processor, cause the image processing device to:

in a case where an obtainment request is received from a first terminal device, send to the first terminal device at least one piece of setting data among the plurality of pieces of setting data stored in the memory;

in a case where specific setting data is selected from among the at least one piece of setting data in the first terminal device after the at least one piece of setting data has been sent to the first terminal device, receive from the first terminal device an execution request for the image processing, the execution request including related information related to the specific setting data;

in a case where the execution request is received from the first terminal device, cause the image processing execution unit to execute the image processing according to one or more setting values corresponding to the related information included in the execution request;

receive a specific request including first user information from a second terminal device;

in a case where the specific request is received from the second terminal device, store receipt information in the memory in association with the first user information, the receipt information indicating receipt of the specific request;

determine whether target setting data associated with the first user information exists in the plurality of pieces of setting data stored in the memory based on the receipt information associated with the first user information, the target setting data being setting data of which non-use period exceeds a predetermined period; and in a case where it is determined that the target setting data exists, delete the target setting data from the memory.

\* \* \* \* \*